United States Patent [19]
Meyer et al.

[11] 4,283,778
[45] Aug. 11, 1981

[54] PROGRAMMABLE SEISMIC CABLE

[75] Inventors: Herbert J. Meyer, Bellaire; Thomas L. Smitherman, Houston, both of Tex.

[73] Assignee: Texaco Inc., White Plains, N.Y.

[21] Appl. No.: 43,201

[22] Filed: May 29, 1979

[51] Int. Cl.³ .......................... G01V 1/22; G01V 1/16
[52] U.S. Cl. ........................................ 367/58; 367/76; 174/70 R
[58] Field of Search ............................. 367/58, 62, 76; 339/148; 174/70 R, 72 R; 340/150

[56] References Cited

U.S. PATENT DOCUMENTS

| | | | |
|---|---|---|---|
| 2,581,994 | 1/1952 | Winterhalter | 367/76 |
| 3,096,846 | 7/1963 | Savit et al. | 367/62 |
| 3,400,782 | 9/1968 | Green | 367/58 |
| 3,618,000 | 11/1971 | Carruth | 367/58 |
| 4,041,445 | 8/1977 | Carter | 367/58 |
| 4,148,006 | 4/1979 | Kelm | 367/76 |

Primary Examiner—Nelson Moskowitz
Attorney, Agent, or Firm—Carl G. Ries; Robert A. Kulason; Henry C. Dearborn

[57] ABSTRACT

A seismic type electrical multiconductor cable. It is made up with a predetermined length of cable, and has a number of geophone takeout connectors spaced along that length of cable. These takeouts are electrically connected to individual geophone circuits. Half go to pig-tail connected plugs at each end, and there are program circuits that may be plugged into the pig-tail plugs.

By arranging the takeouts in pairs, physically on the same conductor but electrically isolated, only half the number of conductors are needed. There are additional conductors in the cable with multi-circuit connectors at each end. The cables are symmetrical and may be laid out end-to-end. A spread of cables would be made with connection to a recording station centrally of the spread.

5 Claims, 4 Drawing Figures

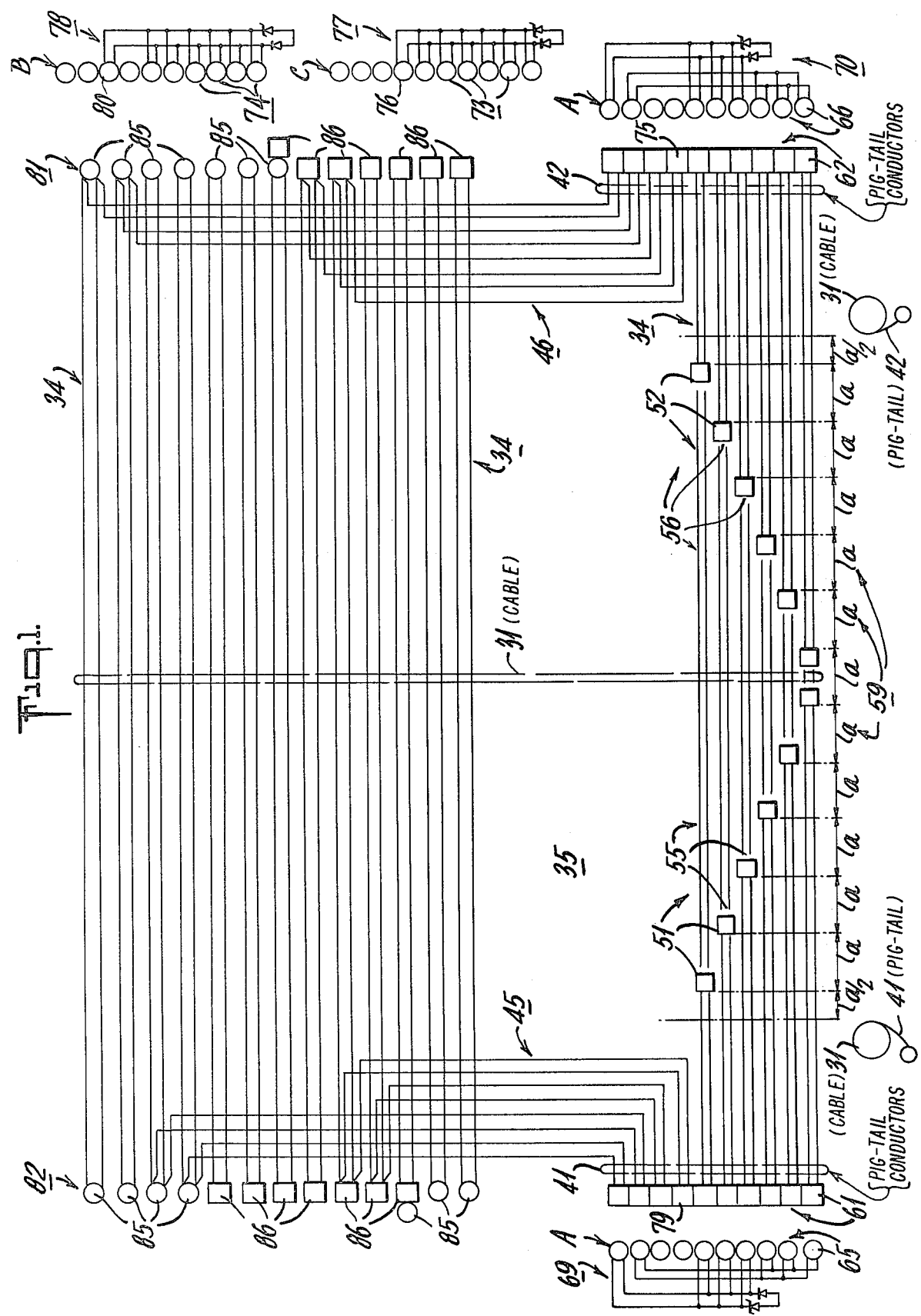

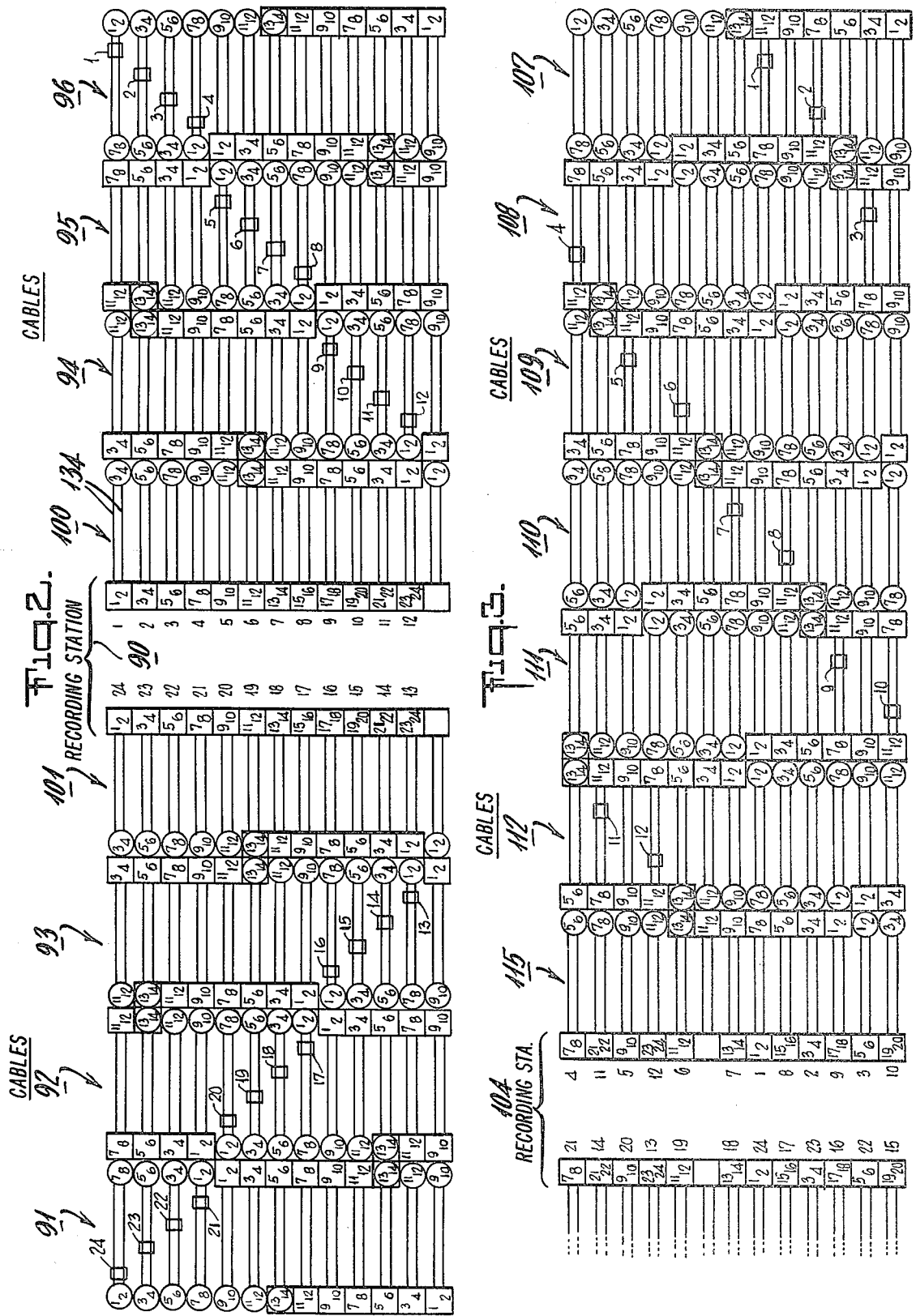

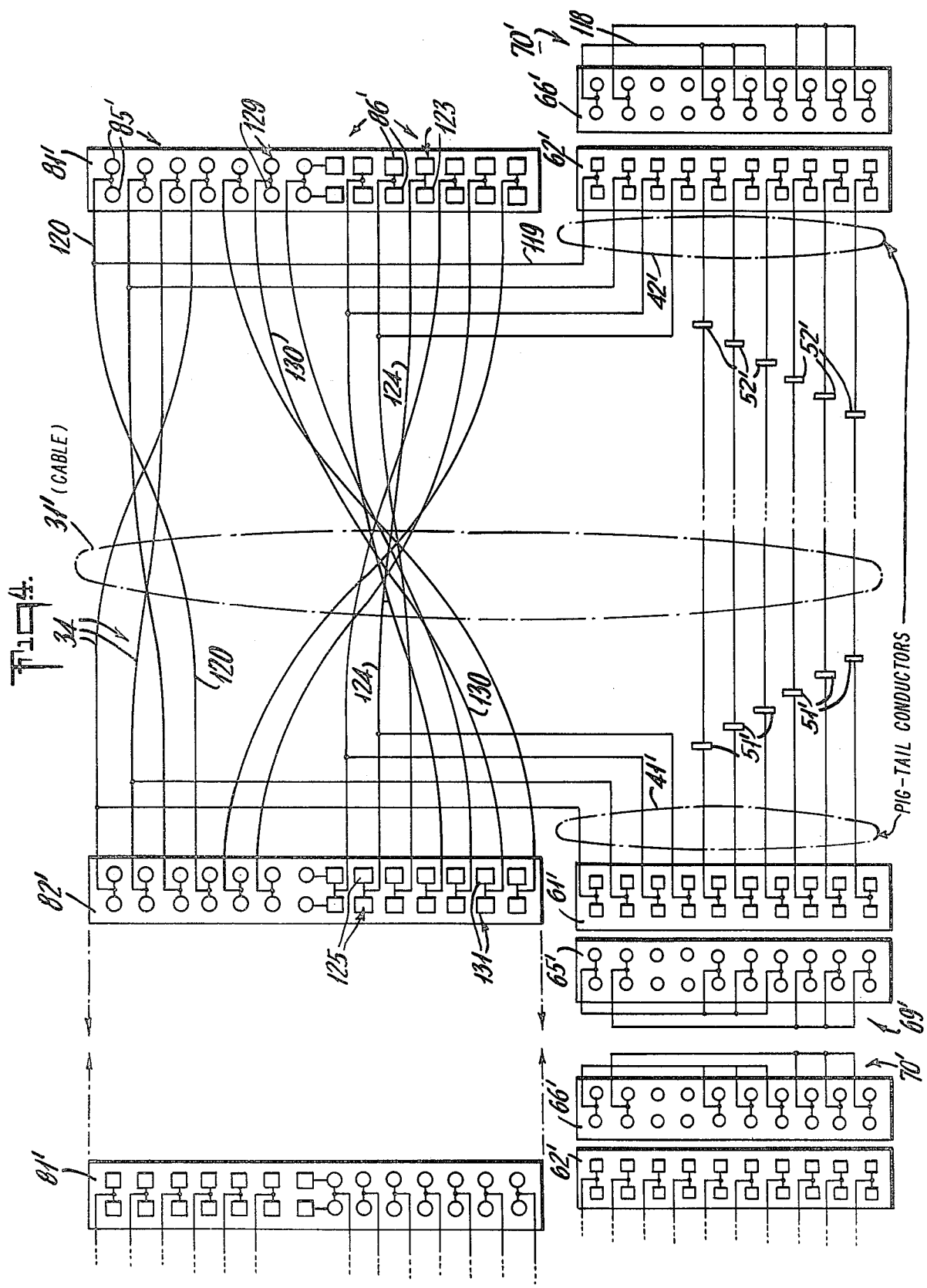

PROGRAMMABLE SEISMIC CABLE

BACKGROUND OF THE INVENTION

1. Field of the Invention

This invention relates to electrical conductor cables, in general, and particularly is concerned with a seismic type of electrical multiconductor cable.

2. Description of the Prior Art

In the past it has been the practice in seismic operations, to make up a different set of cables for each different manner of connecting geophones to a recording station. It depended upon the spacing and particular grouping of geophones in the spread of a seismic layout.

A single cable according to this invention permits the use of a multi-purpose set of cables each cable of which may be very simply changed from time to time in order to provide different groups of geophones for individual channels of data that are connected to the recording station. This is done by merely plugging into each end of a given cable of a program wired connector for the particular grouping desired.

There is a patent which describes a system that can switch geophone circuits in order to change location of groupings along a spread. However, that system involves a single switch board to which all of the geophones on a spread are individually connected. Such system is disclosed in U.S. Pat. No. 3,618,000, issued Nov. 2, 1971, to Henry T. Carruth, Jr.

It is an object of this invention to provide a special seismic cable structure which enables programmable changes in group spacing of geophone connections.

SUMMARY OF THE INVENTION

Briefly, the invention concerns programmable seismic cables for use in connecting a plurality of geophones to a recording station. It comprises in combination a predetermined length of cable having a plurality of conductor-pairs for connecting said geophones to said recording station, and a plurality of take-out connectors spaced apart along said cable for providing connections from said geophones to predetermined ones of said conductor-pairs. A portion of said take-out connectors are electrically connected to first conductor-pairs extending to one end only of said cable, while another portion of said take-out connectors are electrically connected to said second conductor-pairs extending to the other end only of said cable. It also comprises first multi-circuit connectors at the ends of said cable for making selectible group connections of said takeout connectors with third conductor-pairs. The whole combination is effective so that predetermined groups of said take-out connectors may be selectively connected to said recording station.

Again briefly, the invention concerns a programmable seismic cable for use in connecting a plurality of geophones to a recording station. It comprises in combination a predetermined length of cable having a plurality of conductor-pairs exceeding the number of said geophones for connecting to said recording station, and a plurality of take-out connectors spaced evenly apart along said cable for providing connections from said geophones to predetermined ones of said conductor-pairs. Half of the said take-out connectors are electrically connected to first of said conductor pairs extending to one end only of said cable, and the other half of said take-out connectors are electrically connected to second of said conductor-pairs extending to the other end only of said cable. The said first and said second of said conductor-pairs each are physically extensions of the same ones of said cable conductor-pairs. It also comprises first multi-circuit connectors at the ends of said cable for making predetermined group connections of said take-out connectors with third conductor-pairs. The first multi-circuit connectors comprise first half-plugs for disconnectibly receiving predetermined group connections, and second half-plugs for mating with said first half-plugs. It also comprises circuit connections electrically connected to said second half-plugs for making said predetermined group connections. The programmable cable also comprises second multi-circuit connectors at the ends of said cable for making connection with another like cable.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is a schematic diagram which illustrates the circuit connections that are involved in a cable according to the invention, along with some program plug connections which may be employed for changing the groupings on the cable;

FIG. 2 is a schematic diagram illustrating a spread of cables according to the invention. They are connected together and employ the program plugs "A" illustrated in FIG. 1;

FIG. 3 is another schematic diagram, similar to FIG. 2, showing one half of a spread employing cables according to the invention. In this case the program plugs "B" are employed to obtain different groupings of geophone connections; and FIG. 4 is a schematic diagram basically similar to FIG. 1 but illustrated in slightly different form for the purpose of explaining the manner of connecting the various elements, in a seismic cable according to the invention.

DESCRIPTION OF THE PREFERRED EMBODIMENT

FIG. 1 illustrates schematically an entire seismic multiconductor cable, along with three programs "A", "B" and "C" for different groupings of the geophone connections. A multiconductor cable 31 is indicated by a narrow dashed line loop at the center of the diagram. This indicates the fact that the illustrated cable is made up of nineteen conductor-pairs of electrical conductors 34. It will be understood, of course, that these conductors are each insulated and insulated from one another in order that each pair will make up a conductive path for carrying signals from a geophone (not shown) to a central recording station (schematically indicated in FIGS. 2 and 3). Also, it will be understood that the number of conductor pairs may vary as desired without changing the principles of the invention.

It will be noted that there is a space 35 on the diagram, which is between two groups of the conductor-pairs 34. However, this is merely for clarity in the illustration since the physical make-up of the cable will have all conductor-pairs 34 in a unitary cable structure.

The cable 31 has two pig-tail-like groups of conductors 41 and 42. One of these pig-tails 41 and 42 is located at each end of the cable 31. The pig-tails 41 and 42 are indicated schematically by narrow dashed line loops, similar to the indication of the cable 31.

It will be observed that these pig-tail groups of conductors 41 and 42 are made up of six of the conductor pairs 34, as well as four additional conductor pairs 45 and 46 which are located at ends of the cable 31 where the pig-tails 41 and 42, respectively, are situated.

It may be noted that in addition to the circuit diagram of the cable 31 described above, there is schematically indicated in cross section, two diagrams one at each end of the cable 31. The pig-tails 41 and 42 are indicated as being taken off from the main part of the cable 31.

There are a plurality of take-out connectors 51 and 52, which are schematically illustrated as squares in FIG. 1. These are each connected to one of the conductor pairs 34 of those pairs which are separated out at the bottom of the FIG. 1 illustration. It will be noted that the take-outs 51 make up half of the total number of takeouts 51 and 52. The take-outs 51 are located along one half side of the total cable length, while take-outs 52 are symmetrically located along the other half of the cable 31 opposite the take-outs 51.

It is important to note that the conductor pairs which are adjacent to but in between each of the take-out connectors 51 and 52, are not electrically connected with either of the take-out connectors 51 or 52. This is indicated in the diagram by spaces 55 and 56 which are adjacent to the take-out connectors 51 and 52, respectively.

It will be appreciated that the physical form of the take-out connectors 51 and 52 might take various shapes or structures so long as they accomplish the desired electrical connections. However, it will be noted that the arrangement is such that there is only a single conductor pair 34 needed to make the connection to both take-out connectors 51 and 52 on any given conductor-pair 34. This saves duplication of the cable structure for the separate electrical circuits involved.

It may also be pointed out that the take-out connectors 51 and 52 are located physically spaced apart along the total length of the cable 31. Such spacing is indicated on the diagram by distances 59, which have the letter "a" applied thereto on the diagram. Thus, the total length of the cable 31 between its ends is about 12a. One half of the distance "a" is at each end, as is indicated by the "a/2" captions.

There is a half-plug 61 and another half-plug 62 one at each end of the cable 31. These are connected to the conductor-pairs 34 that lead to the take-out connectors 51 and 52, as well as to the pig-tail conductor-pairs 45 and 46, respectively. In addition, there is a mating half plug 65 and another mating half-plug 66, which are both detachably connectable with the half-plugs 61 and 62, respectively. It will be noted that the drawing schematics provide squares for the half-plugs 61 and 62, and circles for the half-plugs 65 and 66.

There are circuit connections 69 and 70 that are connected to the half-plugs 65 and 66. These are designed so as to provide a desired program circuit for the cable 31 when both of the identical half-plugs, along with the circuit connections 69 and 70, are connected into the cable circuits leading from the pig-tail groups of conductors 41 and 42.

It will be noted that when the circuit connections 69 and 70 are completed by reason of having the half plugs 65 and 66 plugged into the mating half-plugs 61 and 62, the circuit connections 69 and 70 are such as to connect the take-out connectors 51 and 52 into two groups of three for each set of six take-out connectors. Consequently, the twelve take-out connectors 51 and 52 are connected into four groups of three. Each group has three take-outs 51 or 52 connected in parallel. These connections go via the pigtail groups of conductors 41 and 42, and it will be observed that the upper two (as viewed in FIG. 1) of the conductor pairs in the pairs 45 and 46, respectively, go up to the indicated conductor-pairs 34 of the cable 31. This connects the groups of three take-outs (as determined by the circuit connections 69 and 70), into predetermined conductor pairs of the cable. The conductor pairs then carry the circuit connections along the cable to a corresponding adjoining cable, or to the recording station which is usually at the middle of a spread. This will be explained in greater detail in connection with FIGS. 2 and 3, hereafter.

It will be observed that the half-plugs 65 and 66 both carry a designation "A". This is to indicate that they both have the same circuit connections, i.e. connections 69 and 70 are the same so that the connections into the cable circuits are identical at both ends of the cable. The same situation holds true for a half-plug 73 (program "C") and another half-plug 74 (program "B") which are illustrated on the right hand side of FIG. 1 and situated above the halfplug 66.

Thus, the half-plug 73 has circuit connections 77 connected thereto. This connects all six of the take-out connectors 52 or 51 to the terminals for one conductor pair, which in this case is that connected to a fourth connection element 76 of the half-plug 73, counting down from the top as viewed in FIG. 1. Consequently, when the program determined by employing half plugs 73, i.e. program "C" is plugged into both ends of the cable, the six take-out connectors 52 and 51 are connected respectively with a mating connection element 75 and 79 in each case. These elements 75 and 79 are connected to a particular conductor pair in the pig-tail connectors 42 and 41 respectively, which lead up to particular circuits of the cable conductor pairs 34.

Similarly, there are circuit connections 78 which are associated with the half-plug 74. These connections provide for a program "B" when two of the half-plugs 74 are connected into the pig-tail mating half-plugs 62 and 61 at the ends of the cable. However, in this instance the same group of six take-out connectors are connected to a connection element 80 which is the third element down from the top, rather than the fourth as was the case for program "C".

As will be pointed out in greater detail hereafter, the program "B" provides for groups of six take-outs per group on the cable 31, while the program "C" provides for 12 take-outs per group on the cable.

It will be observed that at the ends of the cable 31 there are multicircuit connectors 81 and 82. These each have conductor pairs 34 connected to the various pins and sockets of the connectors. It may be noted that the pins are indicated by circles 85 while the sockets are indicated by squares 86. Any feasible type of connector structure may, of course, be employed. For example, there are appropriate connectors manufactured by ITT, Cannon Electric, situated at 666 East Dyer Road, Santa Ana, Calif. 92702.

In the illustrated circuit arrangement the multicircuit connectors 81 and 82 have seven pins 85 and seven sockets 86. However, in each case one of the pins 85 and one of the sockets 86 is internally connected with the other in the connectors 81 and 82. Consequently, the schematic showing indicates one circle and one square side by side.

FIGS. 2 and 3 illustrate schematically two of the program groupings according to programs "A" and "B". These indicate the relationships of the groups of take-out connectors and the circuit connections when a spread is laid out with the cables on each side of a recording station. Thus, in FIG. 2, there is a recording station 90 indicated at the center of six cables 91–96. Three of the cables are on one side of the recording station 90, i.e. cables 91, 92 and 93, while the other three are on the other side, i.e. cables 94, 95 and 96.

Also, in FIG. 2 there are unscrambling cables 100 and 101. These connect the end of cables 94 and 93, respectively, with the recording station 90 in order to make desired connections to each of the 24 recording channels which are indicated by the numerals 1–24 at the station 90.

The spread indicated in FIG. 2 is one resulting from making use of program "A" as illustrated in FIG. 1, i.e. with the half-plugs 66 and 65 connected at each end of each cable 91–96. The take-out connectors (e.g. take-outs 51 and 52 of FIG. 1) are connected in groups of three so that each cable has four groups of three take-out connectors connected in parallel. Each of these groups of three takeouts makes up a single grouping of geophone input connections. Consequently, there are twenty-four groups of three indicated in FIG. 2 by the squares numbered 1 through 24 situated four to a cable. Thus it will be noted that the cable 96 has groups 1–4 while cable 95 has groups 5–8, etc., and cable 91 has groups 21–24.

It may be noted that the group of take-out connectors numbered 1 on cable 96 in FIG. 2 has the circuit connection from it made along the interconnected cables 96, 95 and 94 via pins Nos. 7 and 8 on cable 96 and sockets Nos. 7 and 8 on cable No. 95. It continues via sockets 11 and 12 on cable 95 to pins 11 and 12 on cable 94, then via sockets 3 and 4 on cable 94 to pins 3 and 4 on the unscrambling cable 100 where the circuit carrying signals from the group numbered 1 goes to sockets numbered 1 and 2 of the unscrambling cable 100, for connection to channel number 1 of the recording station 90. It will be understood that while there are 24 channels indicated at the recording station 90, there may be more or less than that number depending upon the particular equipment that is being used. Also, it may be noted that there is an extra circuit made up of a conductor pair on each cable that is unused. This was done so that a spare channel would exist.

FIG. 3 illustrates the layout of one half of a spread using program "B". This produces groupings of six take-out connectors in parallel, so that each cable has two groups of six along its length. Thus, in FIG. 3 there is a recording station 104 (indicated by the bracket) while only one side of the spread is illustrated to save space. There are twice as many as the number used in program "A" (FIG. 2), because each cable is only using two groups of take-out connectors, instead of four. Consequently, in FIG. 3, there are cables 107 through 112 plus an unscrambling cable 115, which makes up one slide of the spread.

It will be noted that the pins 85 and sockets 86 (FIG. 1) are indicated in FIGS. 2 and 3 as the numbered pins 1,2; 3,4 etc., through 13, 14. In FIGS. 2 and 3, the pins and sockets 13, 14 are superimposed, showing both a circle and a square at the same location instead of side by side as was the case in FIG. 1.

FIG. 4 illustrates the same cable structure as is schematically indicated in FIG. 1, but in a somewhat different schematic in order to help clarify the disclosure. In this instance, the elements which correspond to those shown in FIG. 1 are indicated by the same reference numbers but with a prime mark therewith. Thus, there is a cable 31' which has pig-tail groups of conductors 41' and 42' that are connected to conductor-pairs 34'. In FIG. 4 all the conductor pairs are indicated by a single-line showing. The take-out connectors 51' and 52' are spaced along the length of the cable 31', similarly as was the case in the FIG. 1 showing.

In FIG. 4 the multi-circuit connectors 81' and 82' are illustrated by showing pairs of pins 85' and pairs of sockets 86', instead of the single circles 85 (indicating the pins) in FIG. 1 and the single squares 86 (indicating the sockets) in FIG. 1.

Similarly, at the pig-tail connections 41' and 42', there are shown the half-plugs 61' and 62' which show pairs of sockets that will mate with the corresponding pairs of pins in the half-plugs 65' and 66'. The half-plugs 65' and 66' are shown adjacent to the half-plugs 61' and 62', respectively.

In FIG. 4 the left hand side of the illustration shows schematically how another cable will be connected to make up the cables of a spread. Thus, another multi-circuit connector 81' will be plugged into the connector 82' for connecting another cable therewith. Similarly, the half-plug 62' of the other cable will have the mating half-plug plugged in to make program "A" groupings of three take-out connectors.

Referring to FIGS. 4 and 2, some of the circuits related to program "A" (circuit connections 69' and 70') may be traced as follows. Beginning with FIG. 4 and assuming that the connections are made with the program half-plugs 65' and 66' mated with the pig-tail half-plugs 61' and 62' respectively. It may be noted that this program connects four groups of three take-out connectors in parallel which makes a spread like that illustrated in FIG. 2.

In FIG. 4 the upper three take-out connectors 52' are connected in parallel over a circuit connection 118. This is a single line representation for the circuit pair shown in FIG. 1. Connection 118 carries the three circuits in parallel to the uppermost pair of pins in the half-plug 66'. The connection continues via the uppermost pair of sockets of the half-plug 62', and goes via a connection 119 to a main cable circuit connection 120.

The connection 120 leads to the uppermost pair of pins (as viewed in FIG. 4) of the multi-circuit connector 81'. These same pins are indicated in the FIG. 2 showing by the numbers 1 and 2 in the uppermost circle on the right hand end of the cable 96.

The circuit connection 120 goes along the cable 31' to the pair of pins on the other multi-circuit connector 82' which correspond with the pins numbered 7 and 8 of cable 96 on the FIG. 2 diagram. Then as indicated in FIG. 4, the next multi-circuit connector 81' is plugged into the multi-circuit connector 82' so that the mating sockets numbered 7 and 8 (as indicated in the FIG. 2 showing of cable 95) are connected to the pins numbered 7 and 8 of the cable 96 multi-connector 82'. The circuit continues from the sockets numbered 7 and 8 of the cable 95 (FIG. 2) which now may be considered as a pair of sockets 123 of the FIG. 4 diagram.

Now, considering the FIG. 4 diagram to represent the cable 95 of FIG. 2, the circuit continues from the pair of sockets 123 (sockets numbered 7 and 8 of FIG. 2)

via a circuit connection 124 to a pair of sockets 125 of the multicircuit connector 82' (FIG. 4). This pair of sockets 125 corresponds to the sockets numbered 11 and 12 on the left hand end of cable 95 in FIG. 2.

The next cable, i.e. cable 94 (FIG. 2), will carry the circuit along via its pins numbered 11 and 12. As indicated in FIG. 4 this will be a pair of pins 129. The circuit continues over a circuit connection 130 to a pair of sockets 131, which correspond with the sockets numbered 3 and 4 on cable 94 (FIG. 2).

Finally, the circuit continues via a conductor pair 134 as shown in FIG. 2. This is one of the pairs of conductors in the descrambling cable 100. It will be understood that for each separate program of different geophone groupings there will be a particular set of unscrambling cables in order to provide the correct connections for the predetermined groups of take-out connectors to corresponding channels at the recording station.

It may be noted once more that for each particular program to provide a predetermined grouping of take-out connectors, the program plugs to make such program connections are the same. One is plugged into the pig-tail half-plug on each end of each cable. This sets up the circuit connections for the desired groupings as indicated by the schematics of FIGS. 2 and 3. It will be understood that a similar arrangement of cables would be employed to make a spread according to the third set of programmed connections, i.e. the program "C" that has the circuit connections 77 employed therewith. In such case, the spread will employ twice as many cables as those illustrated in FIG. 3 because each cable will have all twelve take-out connectors connected in parallel. Consequently, only one channel of of seismic data signals will go to the recording station from each cable.

It may be noted that in FIG. 1 there is included with each of the program connections 69, 70, 77 and 78 a pair of diodes. One is a zener diode and they are connected with each of the groups of paralleled take-out connectors. These are for use in making continuity check from the recording station in a manner that is explained and claimed in a co-pending application Ser. No. 911,563 filed June 1, 1978 and assigned to the same assignee as this application. The use of these elements does not interfere with the passage of the seismic signals which are relatively low voltage.

While a particular embodiment of the invention has been described above in considerable detail in accordance with the applicable statutes, this is not to be taken as in any way limiting the invention but merely as being descriptive thereof.

We claim:

1. Programmable seismic cable for use in connecting a plurality of geophones to a recording station, comprising in combination
   a predetermined length of cable having a plurality of conductor-pairs for connecting said geophones to said recording station,
   a plurality of take-out connectors spaced apart along said cable for providing connections from said geophones to predetermined ones of said conductor-pairs,
   a portion of said take-out connectors being electrically connected to first conductor-pairs extending to one end only of said cable,
   another portion of said take-out connectors being electrically connected to second conductor-pairs extending to the other end only of said cable, and
   a multi-circuit connector at each end of said cable with pig-tail conductor-pairs for making selectable group connections of said take-out connectors with third conductor-pairs of said cable,
   whereby predetermined groups of said take-out connectors may be selectively connected to said recording station.

2. Programmable seismic cable according to claim 1, wherein
   said multi-circuit connectors comprise first half-plugs for disconnectably receiving predetermined group connections.

3. Programmable seismic cable according to claim 2, further comprising
   second half-plugs adapted for mating with said first half-plugs, and
   circuit connections electrically connected to said second half-plugs for making said predetermined group connections.

4. Programmable seismic cable according to claim 3, further comprising in combination
   second multi-circuit connectors at the ends of said cable for making connection with other like cables.

5. Programmable seismic cable for use in connecting a plurality of geophones to a recording station, comprising in combination
   a predetermined length of cable having a plurality of conductor-pairs exceeding the number of said geophones for connecting to said recording station,
   a plurality of take-out connectors spaced evenly apart along said cable for providing connections from said geophones to predetermined ones of said conductor-pairs,
   half of said take-out connectors being electrically connected to first of said conductor-pairs extending to one end only of said cable,
   the other half of said take-out connectors being electrically connected to second of said conductor-pairs extending to the other end only of said cable,
   said first and said second of said conductor pairs each being physically extensions of the same ones of said cable conductor pairs,
   first multi-circuit connectors at the ends of said cable for making predetermined group connections of said take-out connectors with third conductor-pairs, comprising
   first half-plugs for disconnectably receiving predetermined group connections,
   second half-plugs for mating with said first-half plugs, and
   circuit connections electrically connected to said second half-plugs for making said predetermined group connections, and
   second multi-circuit connectors at the ends of said cable for making connection with another like cable.

* * * * *